US009491773B2

(12) United States Patent
Gaal et al.

(10) Patent No.: US 9,491,773 B2
(45) Date of Patent: Nov. 8, 2016

(54) INTERFERENCE MANAGEMENT FOR DIFFERENT WIRELESS COMMUNICATION TECHNOLOGIES

(71) Applicant: QUALCOMM Incorporated, San Diego, CA (US)

(72) Inventors: Peter Gaal, San Diego, CA (US); Avneesh Agrawal, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 14/576,607

(22) Filed: Dec. 19, 2014

(65) Prior Publication Data
US 2015/0105092 A1    Apr. 16, 2015

Related U.S. Application Data

(63) Continuation of application No. 12/557,435, filed on Sep. 10, 2009, now Pat. No. 8,958,371.

(60) Provisional application No. 61/096,593, filed on Sep. 12, 2008, provisional application No. 61/098,736, filed on Sep. 19, 2008.

(51) Int. Cl.
*H04W 4/00* (2009.01)
*H04W 72/08* (2009.01)
(Continued)

(52) U.S. Cl.
CPC ....... *H04W 72/082* (2013.01); *H04W 72/0413* (2013.01); *H04W 88/06* (2013.01); *Y02B 60/50* (2013.01)

(58) Field of Classification Search
CPC ......... H04W 72/082; H04W 72/0413; H04W 88/06; H04W 72/08; Y02B 60/50
USPC ............. 370/230, 230.1, 231–232, 235, 370/328–330, 335–336, 338, 342–343, 370/345–346, 437, 441–444, 465, 468
See application file for complete search history.

(56) References Cited

U.S. PATENT DOCUMENTS 6,603,748 B1 * 8/2003 Lu .................. H04W 36/30
370/329
7,184,792 B2 * 2/2007 Mir ................. H04W 56/00
370/328

(Continued)

FOREIGN PATENT DOCUMENTS

CN    101305635 A    11/2008
EP     0802692 A2    10/1997

(Continued)

OTHER PUBLICATIONS

3GPP TS 36.101 V8.3.0 (Sep. 2008), 3rd Generation Partnership Project; Technical Specification Group Radio Access Network; Evolved Universal Terrestrial Radio Access (E-UTRA); User Equipment (UE) radio transmission and reception (Release 8).

(Continued)

*Primary Examiner* — Kevin Mew
(74) *Attorney, Agent, or Firm* — Anthony R. Morris

(57) ABSTRACT

Systems and methodologies for avoiding interference with disparate communication technologies when allocating and/or utilizing wireless communication resources are provided. Access points can generate resource assignments for mobile devices based on resources utilized by disparate communication technology devices. The resource assignments may avoid the disparate communication technology resources, allocate narrow bands over the disparate communication technology resources, and/or avoid or limit allocations in a measurement gap during which disparate communication technology devices communicate. Mobile devices can provide information to the access points, such as a communication technology to avoid interfering or resources utilized by devices of the disparate communication technology. This information can be acquired by receiving signals from the devices and/or detecting presence of the devices. In addition, a mobile device can reduce transmission power over resources used by the disparate communication technology.

24 Claims, 13 Drawing Sheets

(51) Int. Cl.
*H04W 72/04* (2009.01)
*H04W 88/06* (2009.01)

(56) References Cited

U.S. PATENT DOCUMENTS

| | | | |
|---|---|---|---|
| 7,453,854 B2* | 11/2008 | Fujishima | H04B 7/0408 370/328 |
| 7,480,504 B2 | 1/2009 | Goulet et al. | |
| 7,548,752 B2 | 6/2009 | Sampath et al. | |
| 7,664,030 B2* | 2/2010 | Sugaya | H04W 72/082 370/235 |
| 7,773,513 B2 | 8/2010 | Beaujean et al. | |
| 7,899,015 B2* | 3/2011 | Bottomley | H04W 4/18 370/328 |
| 7,933,247 B2 | 4/2011 | Gidwani | |
| 7,944,879 B2 | 5/2011 | Choi et al. | |
| 8,068,454 B2 | 11/2011 | Bonta et al. | |
| 8,077,662 B2* | 12/2011 | Srinivasan | H04W 24/02 370/328 |
| 8,121,100 B2 | 2/2012 | Robson et al. | |
| 8,149,555 B2 | 4/2012 | Dorn et al. | |
| 8,219,105 B2* | 7/2012 | Kronestedt | H04W 72/082 370/329 |
| 8,254,368 B2 | 8/2012 | Huber et al. | |
| 8,355,734 B2 | 1/2013 | Naden et al. | |
| 8,472,962 B2 | 6/2013 | Kim et al. | |
| 8,521,206 B2 | 8/2013 | Borran et al. | |
| 8,780,821 B2* | 7/2014 | Zhang | H04L 1/0071 370/329 |
| 2004/0095880 A1* | 5/2004 | Laroia | H04W 52/34 370/208 |
| 2004/0095904 A1* | 5/2004 | Laroia | H04W 52/42 370/329 |
| 2004/0179480 A1 | 9/2004 | Attar et al. | |
| 2005/0276266 A1* | 12/2005 | Terry | H04L 1/0003 370/394 |
| 2006/0209721 A1 | 9/2006 | Mese et al. | |
| 2007/0081468 A1 | 4/2007 | Timus | |
| 2007/0202803 A1 | 8/2007 | Miyoshi | |
| 2008/0008147 A1 | 1/2008 | Nakayama | |
| 2008/0090575 A1 | 4/2008 | Barak et al. | |
| 2008/0095050 A1 | 4/2008 | Gorokhov et al. | |
| 2008/0146269 A1 | 6/2008 | Pirzada et al. | |
| 2008/0212539 A1* | 9/2008 | Bottomley | H04W 4/18 370/335 |
| 2008/0259811 A1 | 10/2008 | Cordeiro et al. | |
| 2008/0259855 A1 | 10/2008 | Yoon et al. | |
| 2009/0052319 A1 | 2/2009 | Muqattash et al. | |
| 2009/0124261 A1* | 5/2009 | Shimomura | H04W 72/082 455/436 |
| 2009/0143019 A1 | 6/2009 | Shellhammer | |
| 2009/0316641 A1* | 12/2009 | Yamada | H04W 56/0005 370/329 |
| 2010/0048237 A1* | 2/2010 | Kishiyama | H04W 52/242 455/522 |
| 2010/0067469 A1 | 3/2010 | Gaal et al. | |
| 2010/0075689 A1* | 3/2010 | Uemura | H04W 52/0206 455/452.1 |
| 2010/0220676 A1 | 9/2010 | Grandblaise et al. | |
| 2011/0134827 A1 | 6/2011 | Hooli et al. | |

FOREIGN PATENT DOCUMENTS

| | | |
|---|---|---|
| EP | 1929821 A2 | 6/2008 |
| JP | 2009509383 A | 3/2009 |
| KR | 20080055819 A | 6/2008 |
| RU | 2007138037 A | 4/2009 |
| WO | 2005101888 A1 | 10/2005 |
| WO | 2006099547 A1 | 9/2006 |
| WO | 2007031957 A2 | 3/2007 |
| WO | 2007031959 A2 | 3/2007 |
| WO | 2007031961 A2 | 3/2007 |
| WO | 2008020278 A2 | 2/2008 |
| WO | 2008086243 A1 | 7/2008 |

OTHER PUBLICATIONS

International Search Report and Written Opinion—PCT/US2009/056730—ISA/EPO—Feb. 4, 2010.

* cited by examiner

INTERFERENCE MANAGEMENT FOR DIFFERENT WIRELESS COMMUNICATION TECHNOLOGIES

CROSS-REFERENCE

This application is a continuation of U.S. patent application Ser. No. 12/557,435, entitled "INTERFERENCE MANAGEMENT FOR DIFFERENT WIRELESS COMMUNICATION TECHNOLOGIES", filed Sep. 10, 2009, which claims the benefit of U.S. Provisional Application Ser. No. 61/096,593, filed Sep. 12, 2008, and entitled "SIGNALING METHODS TO ENABLE SIMULTANEOUS UPLINK TRANSMISSION AND GPS RECEPTION," and U.S. Provisional Application Ser. No. 61/098,736, filed Sep. 19, 2008, and entitled "SIGNALING METHODS TO ENABLE SIMULTANEOUS UPLINK TRANSMISSION AND GPS RECEPTION," the entireties of which are incorporated herein by reference.

BACKGROUND

I. Field

The present disclosure relates generally to wireless communications and more specifically to managing interference in communicating over disparate technologies.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

The access points can assign frequencies to the mobile devices for communicating over the uplink. In some examples, however, assigned frequencies can cause interference to surrounding devices using disparate communication technologies. For example, global positioning system (GPS) devices receive signals over a band around 1.5 gigahertz (GHz) to facilitate GPS technology. Some wireless communication networks allow access points to assign frequencies in the higher 700 megahertz (MHz) range (e.g., band 13). Thus, in one example, the second harmonic order product or spectral regrowth of such assignments can cause interference to GPS signals when simultaneously transmitted. In other examples, frequencies assigned by access points can directly interfere with other technologies, interfere at a third harmonic order product, and/or the like.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating acquiring and utilizing wireless communication resources without interfering devices communicating using disparate communication technologies. In an example, a device can reduce or blank transmit power when it would interfere with devices transmitting using disparate technologies. In another example, the device can adjust reported headroom during periods where transmissions for disparate technologies occur; this can cause the access point to provide low bandwidth allocations to the device that can mitigate interference to the disparate technologies.

In yet another example, the device can signal information to an access point, such as an indication to receive uplink assignments over frequencies that do not interfere with one or more disparate technologies, an indication that the device has a radio to receive communications over one or more disparate technologies, time periods when restricted scheduling is requested (e.g., explicit time intervals or a measurement gap), and/or the like. The access point can utilize this information in providing uplink frequencies that do not interfere with communications over the disparate technologies. In an example, the access point can provide such non-interfering uplink resources without receiving such information, based on a request from a device communicating utilizing the disparate technology, and/or the like.

According to related aspects, a method is provided that includes providing one or more parameters to an access point related to one or more disparate communication technologies potentially interfered by resource allocations from the access point. The method also includes receiving a resource allocation from the access point in response to the one or more parameters.

Another aspect relates to a wireless communications apparatus. The wireless communications apparatus can include at least one processor configured to transmit one or more parameters to an access point indicating resources related to a disparate communication technology to avoid assigning during uplink resource allocations. The at least one processor is further configured to receive a resource allocation from the access point related to transmitting the one or more parameters. The wireless communications apparatus also comprises a memory coupled to the at least one processor.

Yet another aspect relates to an apparatus. The apparatus includes means for communicating one or more parameters to an access point related to avoiding interference with a disparate communication technology during resource allocation. The apparatus further includes means for receiving a resource allocation from the access point in response to the one or more parameters.

Still another aspect relates to a computer program product, which can have a computer-readable medium including code for causing at least one computer to provide one or more parameters to an access point related to one or more disparate communication technologies potentially interfered by resource allocations from the access point. The computer-readable medium can also comprise code for causing the at least one computer to receive a resource allocation from the access point in response to the one or more parameters.

Moreover, an additional aspect relates to an apparatus including a parameter signaling component that communicates one or more parameters to an access point related to avoiding interference with a disparate communication technology during resource allocation. The apparatus can further include an assignment receiving component that obtains a resource allocation from the access point in response to the one or more parameters.

According to further aspects, a method is provided that includes receiving a resource allocation from an access point that potentially interferes with devices communicating according to a disparate communication technology. The method also includes determining one or more time periods over which utilizing the resource allocation interferes with the devices communicating according to the disparate communication technology and lowering transmit power during the one or more time periods.

Another aspect relates to a wireless communications apparatus. The wireless communications apparatus can include at least one processor configured to obtain a resource allocation from an access point that includes one or more frequencies utilized for communicating using a disparate communication technology. The at least one processor is further configured to discern one or more time periods over which devices of the disparate communication technology communicate and lower transmit power for the one or more frequencies over the one or more time periods. The wireless communications apparatus also comprises a memory coupled to the at least one processor.

Yet another aspect relates to an apparatus. The apparatus includes means for receiving a resource allocation from an access point that relates to one or more frequencies utilized for communications in a disparate communication technology and means for determining one or more time periods over which one or more devices communicate using the disparate communication technology. The apparatus further includes means for lowering transmit power over the one or more frequencies during the one or more time periods.

Still another aspect relates to a computer program product, which can have a computer-readable medium including code for causing at least one computer to receive a resource allocation from an access point that potentially interferes with devices communicating according to a disparate communication technology. The computer-readable medium can also comprise code for causing the at least one computer to determine one or more time periods over which utilizing the resource allocation interferes with the devices communicating according to the disparate communication technology and code for causing the at least one computer to lower transmit power during the one or more time periods.

Moreover, an additional aspect relates to an apparatus including an assignment receiving component that obtains a resource allocation from an access point that relates to one or more frequencies utilized for communications in a disparate communication technology. The apparatus can further include an interference detecting component that determines one or more time periods over which one or more devices communicate using the disparate communication technology and a power reducing component that decreases transmit power over the one or more frequencies during the one or more time periods.

According to yet another aspect, a method is provided that includes determining one or more resources that are utilized for communicating in one or more disparate communication technologies and generating a resource allocation for a mobile device that mitigates interference with the one or more resources.

Another aspect relates to a wireless communications apparatus. The wireless communications apparatus can include at least one processor configured to receive one or more parameters regarding resources utilized for communicating in one or more disparate communication technologies. The at least one processor is further configured to generate a resource allocation for a mobile device based at least in part on the one or more parameters. The wireless communications apparatus also comprises a memory coupled to the at least one processor.

Yet another aspect relates to an apparatus. The apparatus includes means for receiving one or more parameters regarding resources utilized for communicating by one or more disparate communication technologies. The apparatus further includes means for generating a resource allocation for a mobile device based at least in part on the one or more parameters.

Still another aspect relates to a computer program product, which can have a computer-readable medium including code for causing at least one computer to determine one or more resources that are utilized for communicating in one or more disparate communication technologies. The computer-readable medium can also comprise code for causing the at least one computer to generate a resource allocation for a mobile device that mitigates interference with the one or more resources.

Moreover, an additional aspect relates to an apparatus including a parameter signal receiving component that obtains a signal from a mobile device comprising one or more parameters regarding resources utilized for communicating by one or more disparate communication technologies. The apparatus can further include a resource assigning component that generates a resource allocation for the mobile device based at least in part on the one or more parameters.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
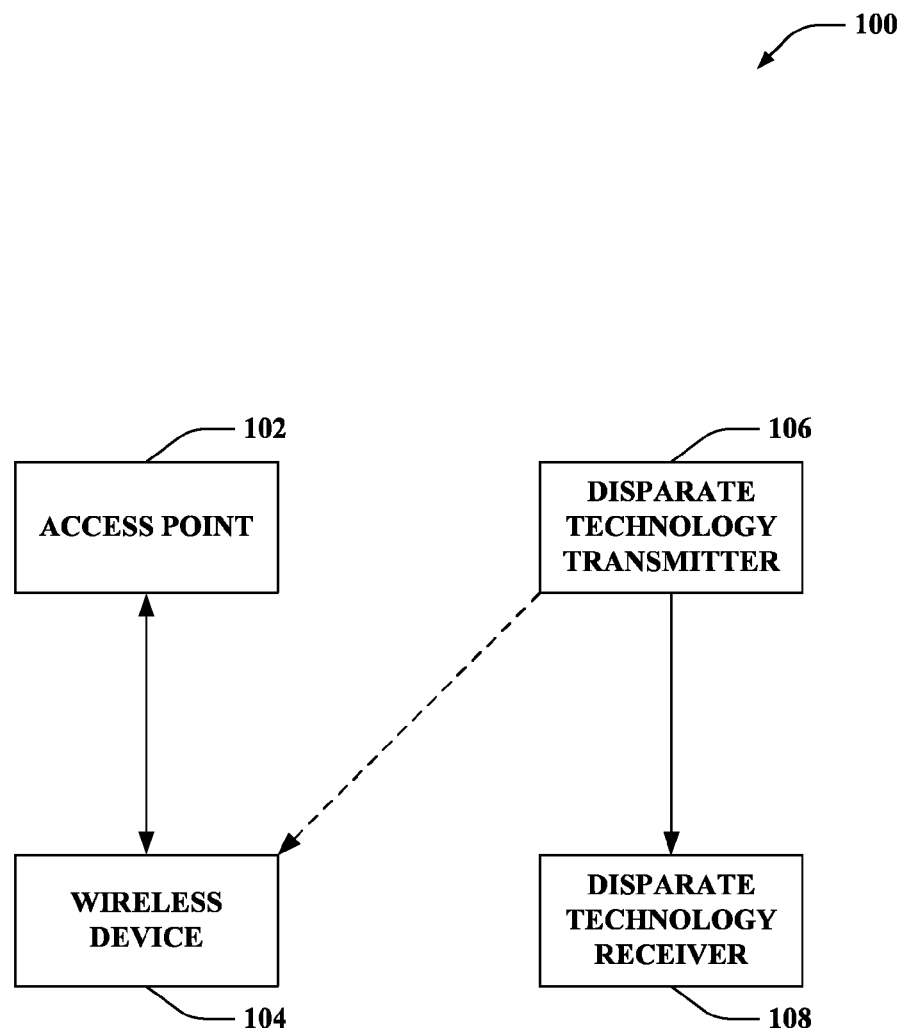
FIG. 1 is a block diagram of a system for mitigating interference to disparate communication technologies in assigning wireless communication resources.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless network 100 that facilitates communicating without causing interference with disparate communication technologies. Access point 102 is provided that communicates with wireless devices 104 to provide wireless network access thereto. Access point 102 can be a macrocell access point, femtocell or picocell access point, or substantially any device that provides access to a wireless network. Wireless device 104 can be a mobile device, modem, and/or substantially any sort of device that can communicate in a wireless network, including a disparate access point, relay node, etc. In addition, network 100 includes a disparate technology transmitter 106 that transmits signals, which can be received by a disparate technology receiver 108 and/or wireless device 104. For example, the disparate technology transmitter 106 and disparate technology receiver 108 can communicate using global positioning system (GPS) technology, MediaFLO, digital video broadcasting-terrestrial (DVB-T), digital video broadcasting-handheld (DVB-H), advanced television systems committee (ATSC), multimedia broadcast multicast service (MBMS), Bluetooth, wireless local area network (WLAN), ultra-wideband (UWB), radio-frequency identification (RFID), or substantially any disparate wireless technology.

According to an example, access point 102 can assign resources to wireless device 104 for communicating over an uplink. The resources can relate to a frequency that interferes with communications between disparate technology transmitter 106 and disparate technology receiver 108 when in close proximity (or interferes with wireless device 104 receiving signals from disparate technology receiver 108 where the wireless device 104 is equipped with a co-located radio). For example, disparate technology transmitter 106 can communicate GPS signals to disparate technology receiver 108 (and/or wireless device 104) over a specified frequency, and access point 102 can assign an uplink frequency to the wireless device 104 that interferes directly or on a nth-power harmonic order product or spectral regrowth with the GPS signal (e.g., where n is 2, 3, . . . ). In this example, wireless device 104 can reduce output power over the resources when transmitting uplink communications that interfere with disparate technology transmitter 106 transmissions.

In one example, disparate technology transmitter 106 can transmit intermittent signals over time periods, and the wireless device 104 can reduce power over the frequency only during the time periods when disparate technology transmitter 106 is transmitting. In this regard, the wireless device 104 can determine time periods over which to reduce power based at least in part on detecting the signal from disparate technology transmitter 106, being provisioned by hardcoding, access point 102, disparate technology transmitter 106, disparate technology receiver, a specification, configuration, etc. with information regarding the technology utilized by the disparate technology transmitter 106, receiving communication information from a co-located receiver that obtains signals from the disparate technology transmitter 106, such as when signals are or will be transmitted by the disparate technology transmitter 106, and/or the like. For example, where provisioned with the information, the wireless device 104 can always reduce power over given resource to mitigate interference with the disparate technology transmitter 106 transmissions, reduce power only over resources where transmissions from the disparate technology transmitter 106 are detected and/or predicted (e.g., by calculating a subsequent transmit time based on receiving a transmitted signal), and/or the like.

In another example, wireless device 104 can signal information to the access point 102 related to disparate communication technologies, and/or mitigating interference therewith, to receive assignments that do not interfere with the communication technologies. In one example, the access point 102 can receive values described above from the wireless device 104 and transmit a parameter to the wireless device 104 to reduce power, as described above, such that power determination logic is performed at the access point 102. In other examples, wireless device 104 can signal time intervals to the access point 102 related to resources over which the wireless device 104 can or cannot transmit without interfering disparate technology transmitter 106 transmissions directly or by emissions transmitted at spectral regrowths or harmonic order products, and the access point 102 can accordingly schedule or avoid scheduling these resources to the wireless device 104. In a similar example, wireless device 104 can signal a measurement gap during which disparate technology transmitter 106 transmits, and the access point 102 can avoid assigning resources (or can assign limited resources) to the wireless device 104 that are within the gap.

Moreover, for example, access point 102 can avoid scheduling resources to wireless device 104 that interfere with disparate technology transmitter 106 transmissions without receiving signaling from the wireless device 104. For instance, access point 102 can perform assignments described herein to substantially all wireless devices. In another example, access point 102 can receive indication that wireless device 104 does or might interfere with disparate technology transmitter 106 (e.g., from the wireless device 104, other device, such as the interfered device, signal measuring, etc.) and can assign a relatively narrow band uplink frequency assignment to the wireless device 104 (e.g., a more narrow assignment than access point 102 allocates over potentially non-interfering resources). Further, in an example, access point 102 can assign narrow band resources within resources utilized by the disparate technology transmitter 106 to devices with low reported headroom. In this regard, the narrow band assignment generates reduced interference when the resources directly interfere or interfere at a higher spectral regrowth or harmonic order product (e.g., unwanted emissions related to signals transmitted over the resources), with the disparate technology transmitter 106 communications. Additionally, in this regard, wireless device 104 can adjust reported headroom during time periods over which the disparate technology transmitter 106 transmits to receive a low bandwidth allocation from the access point 102, avoiding interfering with the transmission.

In an example, wireless device 104 can utilize media access control (MAC) layer signaling to notify the access point 102 of various conditions described above. For example, wireless device 104 can transmit a MAC signal to the access point 102 indicating which resources (e.g., explicit time periods, frequencies, etc.) to avoid in assignment, where the wireless device 104 is aware of interfered resources. As described, this can be a measurement gap in one example, and the access point 102 can avoid assigning resources (or can assign limited resources) occurring within the gap. In another example, wireless device 104 can generate a MAC signal indicating one or more interfered communication technologies, which can be based at least in part on detecting signals from the type, information regarding a co-located radio for the communication technology at the wireless device 104, etc. The MAC signal can be transmitted to the access point 102, and in either case, the access point 102 can schedule around resources utilized by the disparate communication technology. Where only an indication of the type is received, it is to be appreciated that the access point 102 can synchronize timing with the disparate technology transmitter 106 to determine time periods to avoid for uplink assignments. Moreover, access point 102 can compute transmission times based on a specification; in one example, the specification for the disparate communication technology can indicate transmission intervals, and the access point can calculate a next transmission period based on a previously received transmission. Similarly, wireless device 104 can transmit a radio resources control (RRC) layer message, or substantially any message, to the access point 102 to facilitate this functionality.

Figure 2:
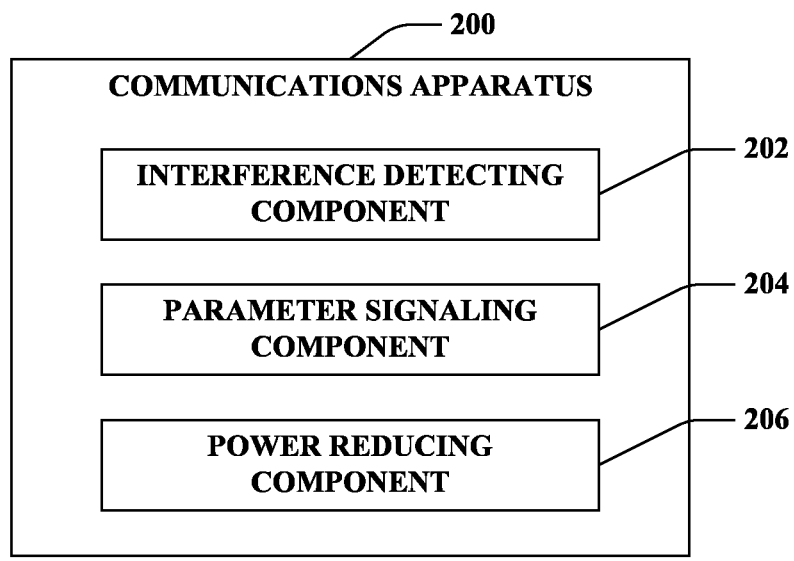
FIG. 2 is an illustration of an example communications apparatus for employment within a wireless communications environment.

Referring next to FIG. 2, a communications apparatus 200 that can participate in a wireless communications network is illustrated. The communications apparatus 200 can be mobile device, access point, a portion thereof, or substantially any device that can receives access to, and/or transmits signals within, a wireless network. The communications apparatus 200 can include an interference detecting component 202 that can determine possible existence of interference to one or more disparate wireless communication technologies and/or resources over which interference is occurring, a parameter signaling component 204 that can notify one or more disparate access points of the potential or existing interference through one or more parameters, and a power reducing component 206 that can lower transmission power over resources determined as potentially or actually interfered.

According to an example, interference detecting component 202 can determine whether communicating with a disparate device or access point in the wireless network causes, or potentially causes, interference to devices communicating using a disparate technology. For example, interference detecting component 202 can always determine potential interference to one or more communication technologies over a set of resources. In another example, interference detecting component 202 can determine potential interference upon detecting signals from a device communicating using the disparate communication technology, receiving notification of device presence, and/or the like. Moreover, for example, interference detecting component 202 can determine potential interference based at least in part on a co-located radio (not shown) that communicates using the disparate communication technology. As described, the interference can relate to direct interference or interference potentially caused by emissions at a spectral regrowth or harmonic order product.

In addition, interference detecting component 202 can also determine resources over which interference with the disparate communication technology can occur. This can be based on, for example, receiving information regarding resources utilized by devices of the disparate communication technology (e.g., in hardcoding, configuration information, from the device, etc.), discerning such information from signals transmitted by the devices, and/or the like. In some examples, it is to be appreciated that the interference detecting component 202 can synchronize timing with the devices to ensure proper determination of resource time periods during which the devices transmit. In one example, the interference detecting component 202 can determine resources utilized by the device based on both received and measured information, such as receiving a time interval during which the devices transmit (e.g., as indicated by one or more devices or inferred from receiving a signal from a device using the disparate communication technology) and discerning a transmission from the devices, from which a subsequent transmission time can be calculated based on the interval.

Once the interference detecting component 202 has determined which resources are utilized by the disparate communication technology, various mechanisms can be utilized to mitigate interference over the resources from transmissions by the communications apparatus 200. In one example, parameter signaling component 204 can transmit one or more parameters related to the interference to an access point that assigns resources to the communications apparatus 200. Such parameters can include, for example, existence of a co-located radio of a given communication technology. In another example, the parameters can include an indication of a communication technology for which to avoid interference in assigning resources, explicit resources over which interference can occur, a measurement gap within which resources are not assigned (or resource assignments are limited), a power headroom, and/or the like. In one example, power headroom can be lowered for resources over which interference detecting component 202 determines potential or actual interference. The parameter signaling component 204 can transmit the reduced headroom report, which can cause a low bandwidth allocation in the resources, mitigating likelihood of interference. In addition, it is to be appreciated that MAC, RRC, or substantially any layer signaling can be utilized to facilitate such functionality.

Figure 3:
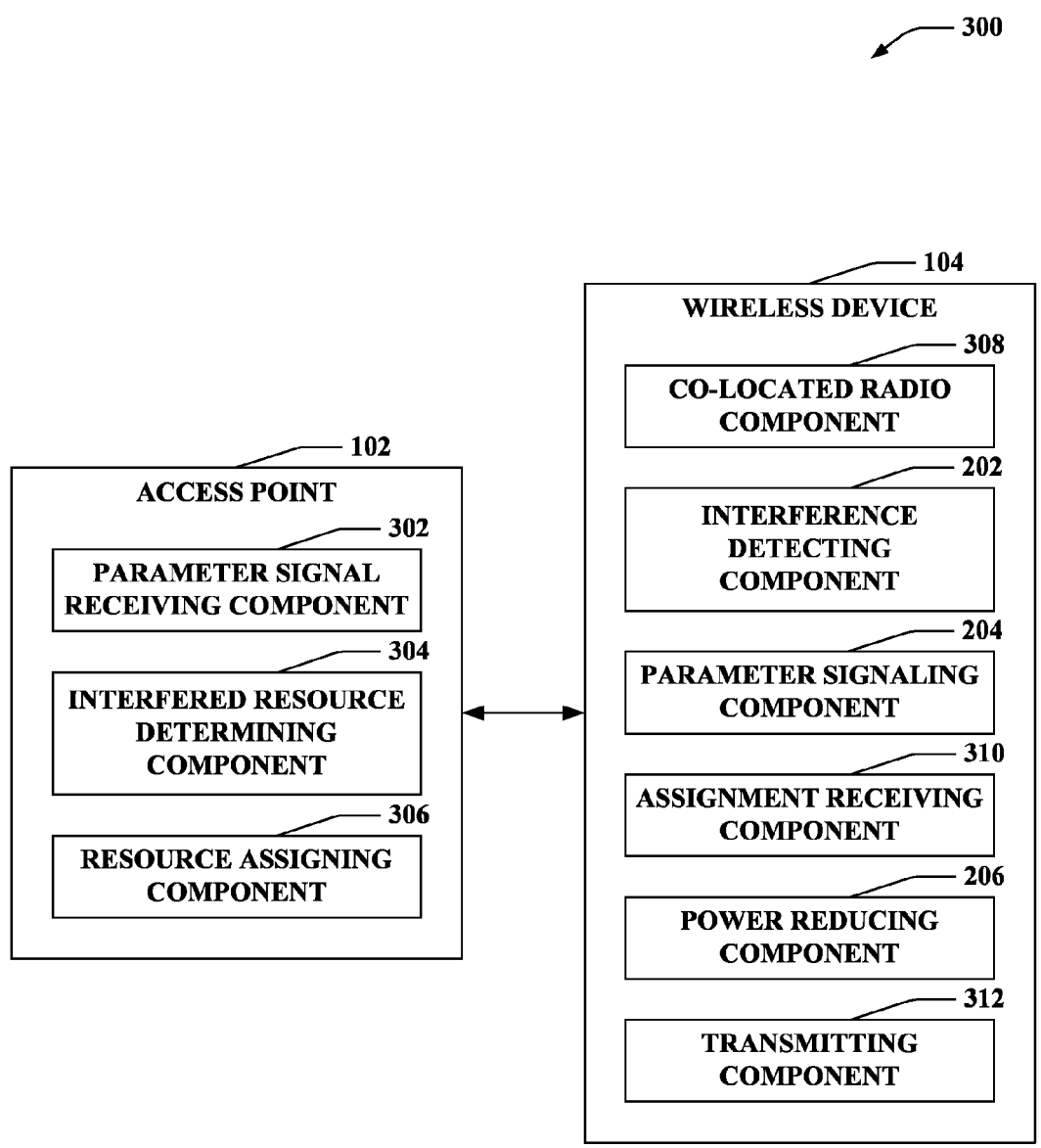
FIG. 3 illustrates an example wireless communication network that effectuates mitigating interference to other technologies in uplink resource assignments.

Now referring to FIG. 3, illustrated is a wireless communications system 300 that facilitates assigning or utilizing resources to mitigate interference with communications from disparate communication technologies. Access point 102, as described, can be substantially any type of base station or mobile device (including not only independently powered devices, but also modems, for example) that provides wireless network access, and/or portion thereof. In addition, wireless device 104 can be a mobile device or other device that receives wireless network access. Moreover, system 300 can be a MIMO system and/or can conform to one or more wireless network system specifications (e.g., EV-DO, 3GPP, 3GPP2, 3GPP LTE, WiMAX, etc.).

Access point 102 can include a parameter signal receiving component 302 that obtains signals from devices comprising parameters related to interference with disparate technology devices, an interfered resources determining component 304 that can discern resources over which communications would be actually or potentially interfering to the disparate technology devices, and a resource assigning component 306 that allocates resources to devices based at least in part on the interference information. Wireless device 104 can include a co-located radio component 308 that communicates with devices of disparate communication technologies, an interference detecting component 202 that determines potential or actual interference with devices communicating using a disparate communication technology, a parameter signaling component 204 that can indicate parameters related to such resources to an access point, an assignment receiving component 310 that can obtain resource assignments for transmitting uplink data, a power reducing component 206 that can lower transmission power, and a transmitting component 312 that can transmit signals over assigned uplink resources.

According to an example, co-located radio component 308 can receive signals from a transmitter of a disparate communication technology (not shown), such as GPS, Bluetooth, WLAN, etc., as described above. In another example, devices near the wireless device 104 can receive such signals. In either case, interference detecting component 202 can determine whether communications over certain allocable resources will actually or potentially cause interference to the transmitter of the disparate communication technology. For example, interference detecting component 202 can determine whether communications interfere directly with the transmitter and/or by emissions at a spectral regrowth or harmonic order product. In one example, interference detecting component 202 can detect potential interference at the spectral regrowth or harmonic order product based at least in part on multiplying frequency utilized in the resources by the harmonic order (e.g., 2, 3, . . . ). If the harmonic order of the frequency is in the band of the transmitter, interference detecting component 202 can determine potential interference to the transmitter at the harmonic order (e.g., at least during time periods utilized by the transmitter). As described, interference detecting component 202 can determine resources utilized by the disparate communication technology based on hardcoded information (e.g., according to a specification of the disparate communication technology) and/or analyzing signals received from the transmitter (e.g., at the co-located radio component 308 or otherwise). Thus, for example, a GPS transmitter can transmit signals to one or more devices or co-located radio component 308. Interference detecting component 202, in this example, can determine resources utilized to transmit the GPS signals from general GPS information, signals obtained from the GPS transmitter, and/or the like.

For example, interference detecting component 202 can determine a frequency based on hardcoded or otherwise received information as being around 1.5 GHz for GPS transmissions. In another example, interference detecting component 202 can additionally or alternatively determine a frequency (and/or related time transmission periods) based on a received signal without knowing the communication technology. From the signal, in this alternate example, interference detecting component 202 can discern a communication technology to facilitate determining resources that may be utilized for subsequent transmissions of the disparate communication technology. A time period and/or interval for the transmission can be determined as well based at least in part on receiving the signal, in one example, and subsequent time periods can be determined based at least in part on a known or received time interval for GPS transmissions.

In another example, interference detecting component 202 can be synchronized to GPS and can discern time periods for transmitting GPS signals based at least in part on hardcoded or received GPS specification information. In any case, the co-located radio component 308 can cause the wireless device 104 to be time synchronized with the disparate communication technology transmissions, from which interference detecting component 202 can substantially accurately determine transmission time periods for GPS signals. In another example, interference detecting component 202 can communicate with the co-located radio component 308 to determine the information regarding signals from the transmitter, which can have been received and/or processed by the co-located radio component 308, such as frequency and time resources utilized, next expected transmission time period, and/or the like.

After acquiring information regarding resources utilized or potentially utilized by the disparate communication technology, the wireless device 104 can avoid interfering with the resources in a variety of ways. In one example, parameter signaling component 204 can generate and transmit a signal to access point 102 comprising information regarding the resources so the access point 102 will assign uplink communication resources to the wireless device 104 that do not interfere (or impose less interference) with the disparate communication technology directly or at a spectral regrowth or harmonic order product. In an example, the signal can be a MAC or RRC layer signal, or similar signal, comprising parameters regarding the disparate technology. In one example, the parameters can be an indication that the disparate communication technology is present (e.g., that wireless device 104 is equipped with a co-located radio component 308 that receives signals of the disparate communication technology, that signals transmitted by devices of the disparate communication technology are otherwise detected by the wireless device 104, etc.). In another example, the parameters can relate to frequencies and/or time periods utilized for transmitting signals of the disparate communication technology. As described, this information can be determined by the interference detecting component 202, from co-located radio component 308, evaluating received signals, and/or the like. In yet another example, the parameters can include both an indication of disparate communication technology with related devices in-range and potentially interfered, and a portion of information regarding resources utilized for the disparate communication technology. For example, as described, the signal can include an indication that the wireless device 104 is GPS-equipped and/or receiving GPS signals as well as a starting time period. As described below, this information can be combined with GPS specification information to determine when, and over what frequencies, subsequent GPS information will be transmitted.

The parameter signal receiving component 302 can obtain the signal from the wireless device 104 comprising parameters regarding communications of disparate communication technology devices. Interfered resource determining component 304 can evaluate the parameters to decide whether interference would result to disparate communication technology devices for certain resources assignments. For example, as described, certain upper 700 MHz uplink transmission assignments could interfere with GPS operating around 1.5 GHz in time periods where GPS signals are transmitted where the uplink transmission assignments relate to a second harmonic order product or spectral regrowth of the GPS signals. Where parameter signal receiving component 302 obtains parameters indicating wireless device 104 has a co-located GPS radio, for example, interfered resource determining component 304 can determine resources over which GPS signals will be received by the co-located radio component 308. In this example, access point 102 can be GPS synchronized and can determine time periods over which GPS signals are received based on a GPS specification, for example. When assigning uplink resources to wireless device 104, resource assigning component 306 can consult interfered resource determining component 304 to discern whether there are resources to avoid in the assignment. In this example, interfered resource determining component 304 can indicate to avoid upper 700 MHz frequency range assignments in certain time periods during which GPS devices transmit signals (or allocate narrow bands in the upper 700 MHz, as described).

It is to be appreciated, however, that timing of signals may not be obtainable. In this example, interfered resource determining component 304 can decide frequency resources related to the communication technology in all time periods are to be treated as potentially interfering, and the resource assigning component 306 can utilize this information in assigning uplink resources. In another example, as described, parameter signal receiving component 302 can obtain a signal with parameters specifying explicit frequencies and/or time periods that are utilized by disparate communication technologies. Additionally or alternatively, the signal can comprise a measurement gap within which the disparate communication technology transmits. In these examples, interfered resource determining component 304 can specify potentially interfered resources based on the information so that resource assigning component 306 can avoid such resources or otherwise tailor resource assignments to not interfere with the resources directly or at a spectral re-growth or harmonic order product. Additionally, as described, it is to be appreciated that interfered resource determining component 304 can detect resources that would potentially interfere with one or more communication technologies without receiving signaling from wireless device 104, but rather from hardcoding, network specification, network component, configuration, device being interfered, and/or the like.

In any case, resource assigning component 306 can allocate uplink transmission resources for wireless device 104 based at least in part on interfered resource indications from interfered resource determining component 304. For example, these can be physical uplink control channel (PUCCH) or physical uplink shared channel (PUSCH) resources in a 3GPP LTE network, and/or the like. As described, resource assigning component 306 can avoid assigning resources that interfere or potentially interfere with the disparate communication technology. For example, resource assigning component 306 can avoid assigning resources for which the disparate communication technology is directly interfered or interfered at spectral regrowth or a second, third, etc., harmonic order product. In another example, resource assigning component 306 can assign resources in a frequency spectrum that interfere with disparate communication technologies, but can allocate relatively narrow band assignments for wireless device 104 and/or other wireless devices. For example, this can be a fraction of a typical resource assignment from the resource assigning component 306 using resources that are determined not to interfere with one or more disparate communication technologies. It is to be appreciated that narrowing the assignment band can decrease direct interference or interference caused at a spectral regrowth or harmonic order product to the disparate communication technology, as described.

Resource assigning component 306 can transmit the assignment to the wireless device 104, and the assignment receiving component 310 can receive the assignment. Furthermore, transmitting component 312 can transmit uplink communications according to the assignment.

In another example, parameter signaling component 204 can report power headroom to access point 102. In this example, parameter signal receiving component 302 can receive the signal, and resource assigning component 306 can assign resources based on consulting interfered resource determining component 304 for potentially interfered resources, as described above. For devices reporting low power headroom, resource assigning component 306 can avoid assigning resources that would potentially interfere with communications of the disparate communication technology. In addition, in this regard, parameter signaling component 204 can drop headroom value for time periods where interference detecting component 202 determines potential interference to disparate communication technologies. In this example, resource assigning component 306 will provide a narrow frequency band allocation to the wireless device 104 during the time period that potentially interferes with the disparate communication technology.

In yet another interference avoidance example, instead of or in addition to signaling parameters to the access point 102, power reducing component 206 can adjust transmission power over resources determined to potentially or actually interfere with devices of the disparate communication technology. In this example, power reducing component 206 can receive (e.g., in a command from the access point 102) or otherwise determine an additional maximum power reduction value (A-MPR) that is utilized to reduce the maximum transmission power over the potentially or actually interfering resources. Additionally, power reducing component 206 can determine resources over which to reduce power based on information from the interference detecting component 202 described above. In addition, however, such resource information can be received from access point 102, which can be present in the resource assigning component 306, as described.

Figure 4:
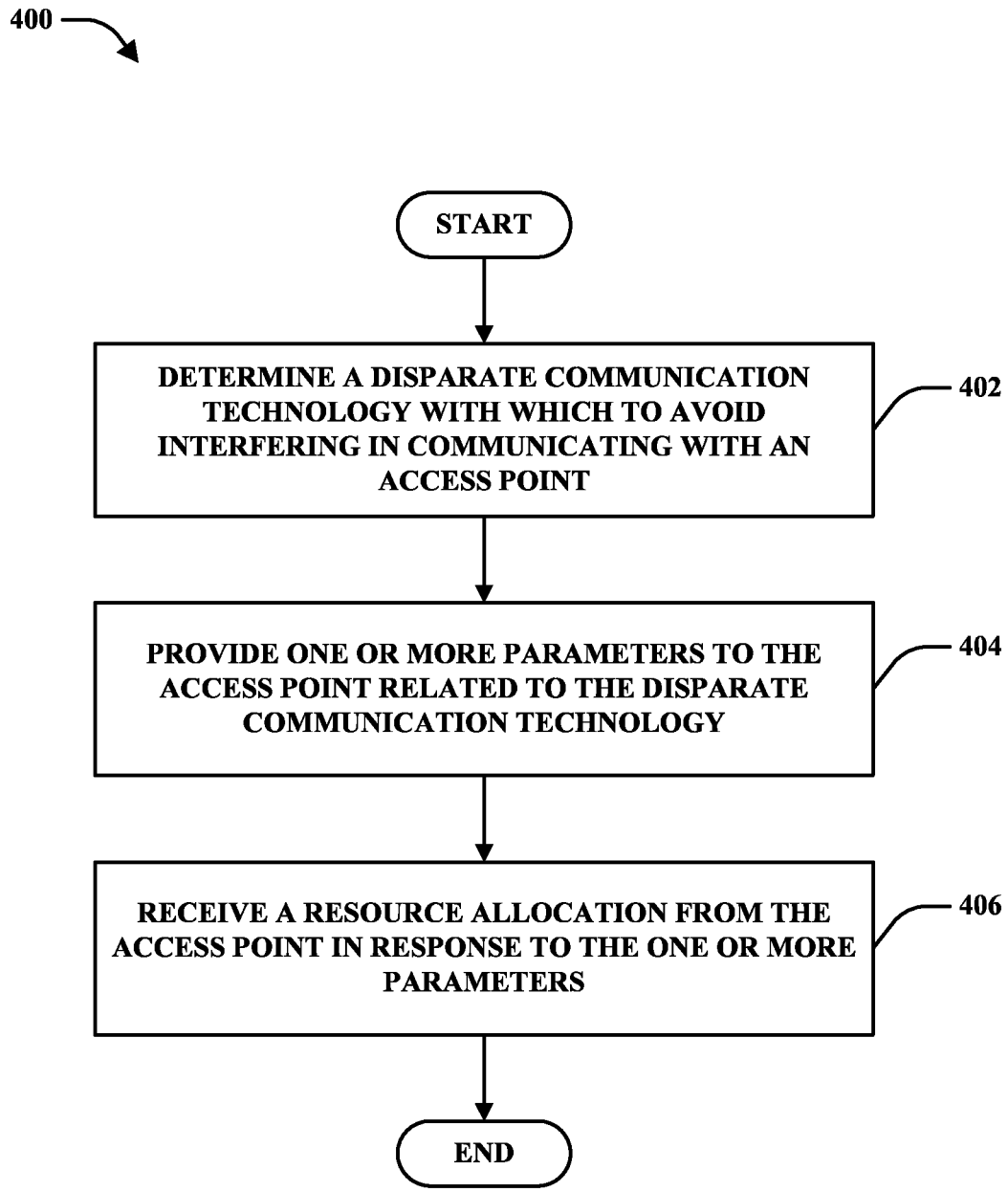
FIG. 4 is a flow diagram of an example methodology that receives a resource allocation according to provided information regarding disparate communication technologies.
Figure 5:
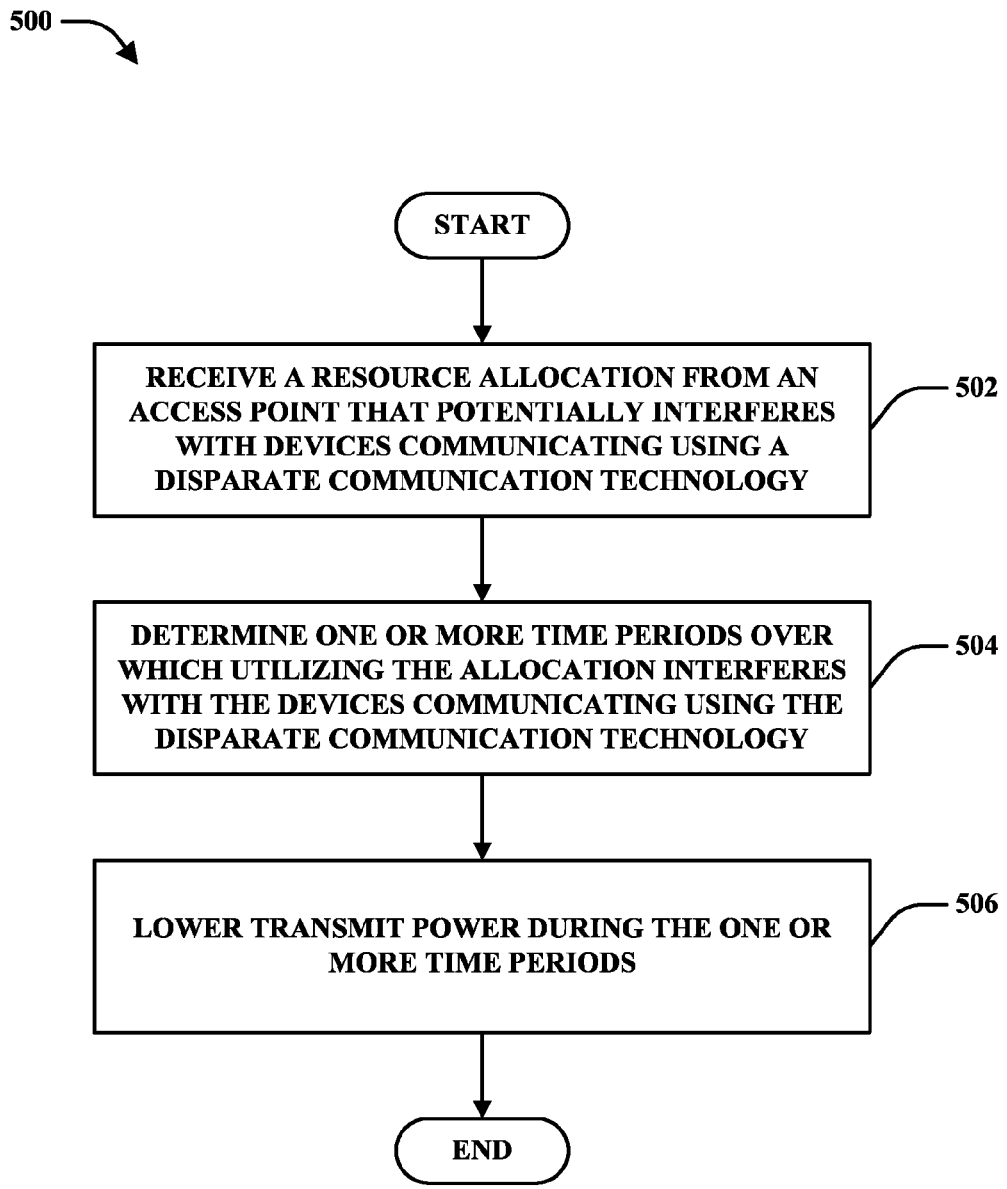
FIG. 5 is a flow diagram of an example methodology that reduces power over resources that potentially interfere with a disparate communication technology.
Figure 6:
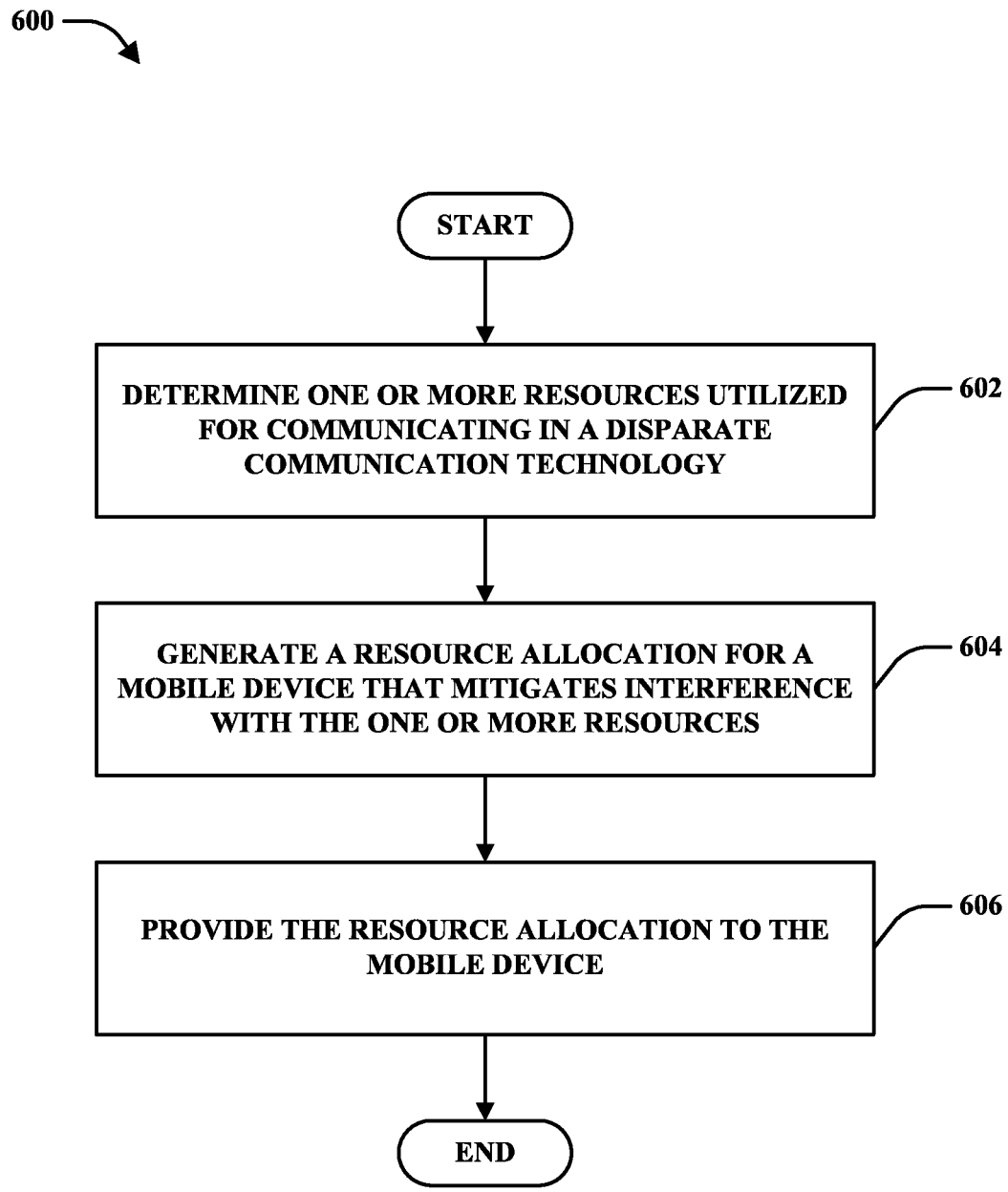
FIG. 6 is a flow diagram of an example methodology for providing resource allocations that mitigate interference with disparate communication technologies.

Referring now to FIGS. 4-6, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 4, illustrated is a methodology 400 for receiving resource allocations based on one or more provided parameters related to a disparate communication technology. At 402, a disparate communication technology with which to avoid interfering in communicating with an access point can be determined. As described, the disparate communication technology can be determined based on detecting a co-located radio, receiving one or more signals from devices communicating using the disparate communication technology (e.g., a request to mitigate interference, intercepted signals between devices, etc.), and/or the like. At 404, one or more parameters can be provided to the access point related to the disparate communication technology.

For example, the one or more parameters can indicate that resources of the disparate communication technology should be avoided, specify the resources of the disparate communication technology, specify a measurement gap during which devices of the disparate communication technology communicate, include a low headroom report for a set of time resources related to the disparate communication technology, and/or the like. At 406, a resource allocation can be received from the access point in response to the one or more parameters. As described, the allocation can include resources that do not directly interfere or interfere at a spectral regrowth or harmonic order product with those utilized by the disparate communication technology, narrow frequency bands over such potentially interfering resources, and/or the like.

Turning to FIG. 5, a methodology 500 is illustrated that facilitates reducing transmit power over allocated resources that potentially interfere with devices using disparate communication technologies. At 502, a resource allocation can be received from an access point that potentially interferes with devices communicating using a disparate communication technology. For example, the resource allocation can relate to uplink transmissions over resources utilized by devices of the disparate communication technology. At 504, one or more time periods can be determined over which utilizing the allocation interferes with the devices communicating using the disparate communication technology. The time periods can be determined, for example, based on information received from a co-located radio that receives communications of the disparate communication technology, one or more signals received from the devices (e.g., that specify the time periods, or intercepting signals and determining related time periods), and/or the like. At 506, transmit power can be lowered during the one or more time periods to mitigate interference with devices that utilize the disparate communication technology.

Referring now to FIG. 6, a methodology 600 is illustrated that facilitates allocating resources to mobile device based at least in part on mitigating interference with one or more disparate communication technologies. At 602, one or more resources utilized for communicating in a disparate communication technology can be determined. For example, this can be to mitigate interference over the one or more resources. A mobile device can provide an indication that such resources should be avoided in assigning resources and the resource can be determined according to a specification, in one example. In another example, the mobile device can provide indication of the actual resources to be avoided, provide a measurement gap within which resource allocations to the mobile device can be avoided or limited, and/or the like, for example. At 604, a resource allocation can be generated for a mobile device that mitigates interference with the one or more resources. This can include, for example, avoiding the resources altogether, assigning a resource allocation that includes the frequency utilized by the disparate communication technology but over time periods not utilized by the disparate communication technology, assigning a narrow frequency band in resources utilized by the disparate communication technology, and/or the like. As described, the interference to be mitigated can relate to direct interference or interference at a spectral regrowth or harmonic order product. It is to be appreciated that direct interference can be determined based on frequencies and/or time periods assigned by the resource allocation, and spectral regrowth or harmonic order product interference can be determined based at least in part on multiplying the frequency by the spectral regrowth or harmonic order to determine whether emissions at the spectral regrowth or higher harmonic order substantially equal frequencies utilized by the disparate communication technology. At 606, the resource allocation can be provided to the mobile device (e.g., for uplink transmissions).

It will be appreciated that, in accordance with one or more aspects described herein, inferences can be made regarding determining resources of a disparate communication technology that are potentially interfered, generating a resource allocation based on such information, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
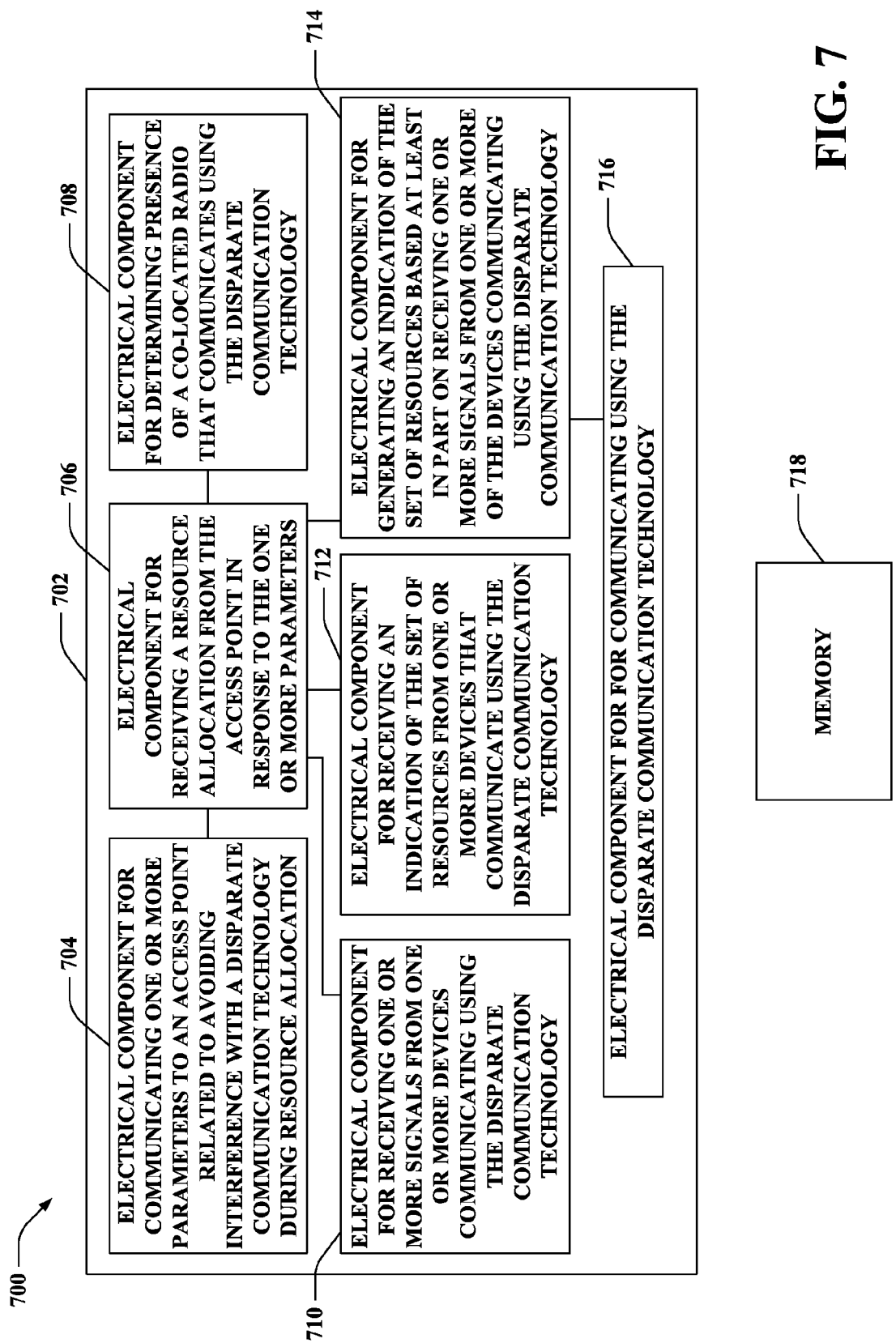
FIG. 7 is a block diagram of an example apparatus that receives resource allocations relating to mitigating disparate communication technology interference.

With reference to FIG. 7, illustrated is a system 700 that receives a resource allocation based at least in part on provided parameters related to devices communicating using a disparate communication technology. For example, system 700 can reside at least partially within a base station, mobile device, or another device that provides access to a wireless network. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for communicating one or more parameters to an access point related to avoiding interference with a disparate communication technology during resource allocation 704. For example, as described, the access point can utilize this information in assigning uplink communication resources. In addition, the parameters can be based on signals received from devices communicating using the disparate communication technology. Further, logical grouping 702 can comprise an electrical component for receiving a resource allocation from the access point in response to the one or more parameters 706. As described, the resource allocation can avoid resources (or just a time periods) that potentially interfere the disparate communication technology, comprise a narrow band allocation over such resources, and/or the like.

Additionally, logical grouping 702 can include an electrical component for determining presence of a co-located radio that communicates using the disparate communication technology 708. Thus, as described, the parameters relating to the disparate communication technology can be determined from the co-located radio (e.g., received therefrom, observed from transmissions of the co-located radio, etc.). Moreover, logical grouping 702 can include an electrical component for receiving one or more signals from one or more devices communicating using the disparate communication technology 710. In this regard, the one or more parameters can be received in the signals or generated based on the signals, as described. Logical grouping 702 can also include an electrical component for receiving an indication of the set of resources from one or more devices that communicate using the disparate communication technology 712.

For instance, devices of the disparate communication technology can request that the mobile device not interfere with resources, provide an indication of the actual resources, and/or the like. Moreover, logical grouping 702 can include an electrical component for generating an indication of the set of resources based at least in part on receiving one or more signals from one or more of the devices communicating using the disparate communication technology 714. Logical grouping 702 can additionally include an electrical component for communicating using the disparate communication technology 716, such as co-located radio, as described. Additionally, system 700 can include a memory 718 that retains instructions for executing functions associated with electrical components 704, 706, 708, 710, 712, 714, and 716. While shown as being external to memory 718, it is to be understood that one or more of electrical components 704, 706, 708, 710, 712, 714, and 716 can exist within memory 718.

Figure 8:
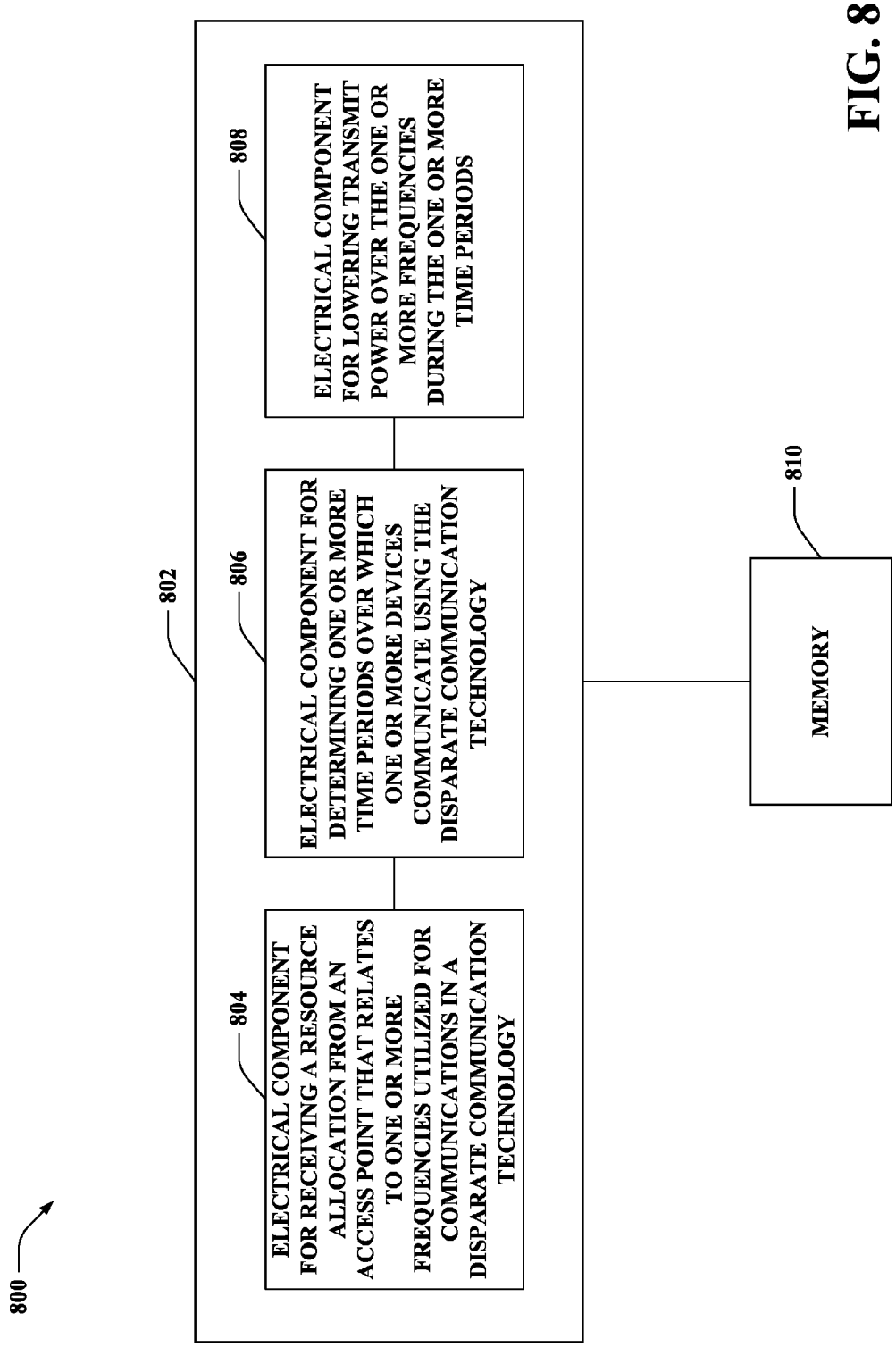
FIG. 8 is a block diagram of an example apparatus that facilitates lowering transmit power during periods occupied by disparate communication technology transmissions.

With reference to FIG. 8, illustrated is a system 800 that reduces transmit power over allocated resources that potentially interfere with devices communicating using a disparate communication technology. For example, system 800 can reside at least partially within a base station, mobile device, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for receiving a resource allocation from an access point that relates to one or more frequencies utilized for communications in a disparate communication technology 804. Further, logical grouping 802 can comprise an electrical component for determining one or more time periods over which one or more devices communicate using the disparate communication technology 806.

As described, in one example, the time periods and frequencies utilized by the disparate communication technology can be determined from a specification, receiving signals from devices that communicate using the disparate communication technology, and/or the like. Moreover, logical grouping 802 includes an electrical component for lowering transmit power over the one or more frequencies during the one or more time periods 808. In one example, transmissions can be cancelled over the time period to eliminate interference over the resources. Additionally, system 800 can include a memory 810 that retains instructions for executing functions associated with electrical components 804, 806, and 808. While shown as being external to memory 810, it is to be understood that one or more of electrical components 804, 806, and 808 can exist within memory 810.

Figure 9:
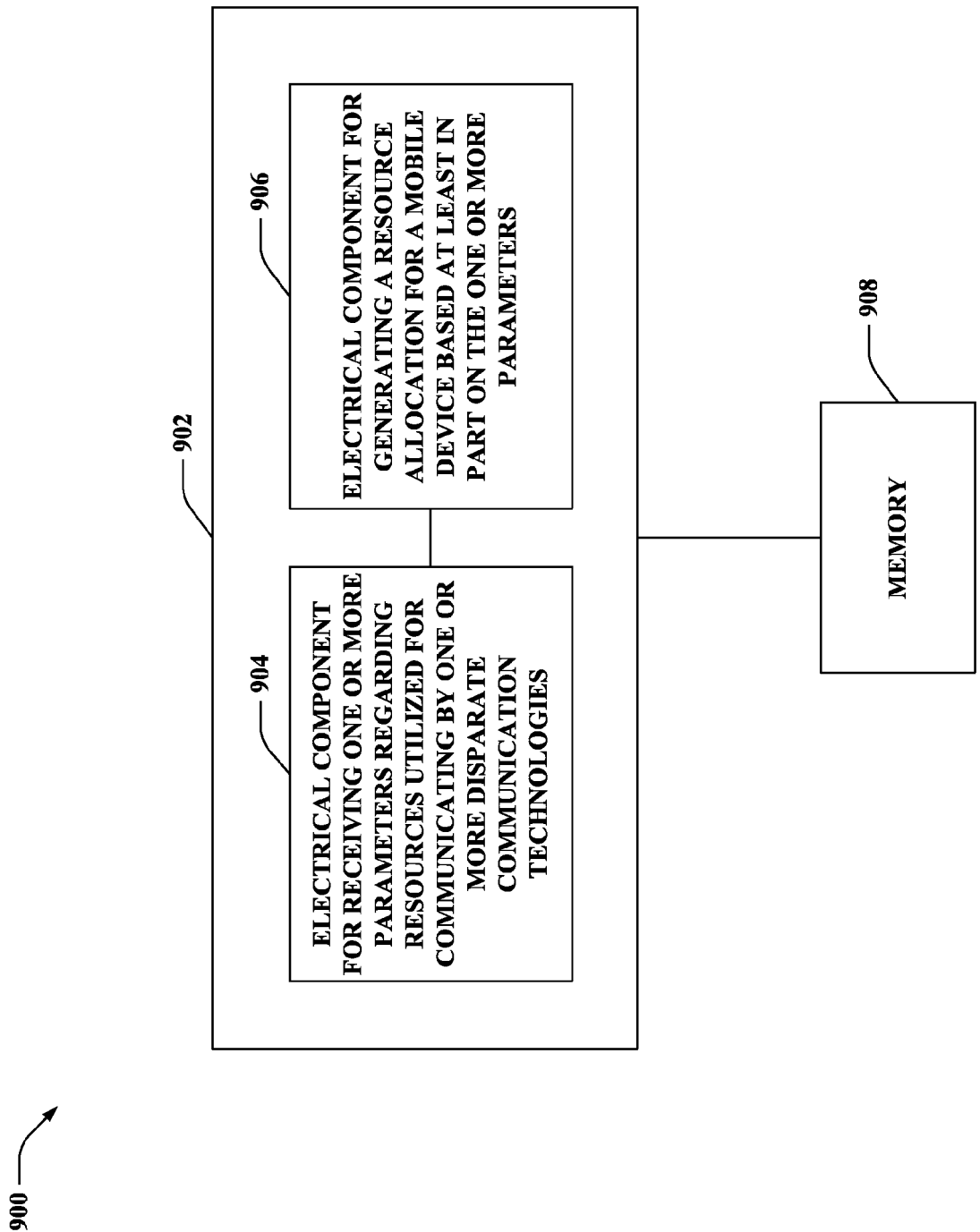
FIG. 9 is a block diagram of an example apparatus that allocates resources that mitigate interference with disparate communication technologies.

With reference to FIG. 9, illustrated is a system 900 that allocates resources to a mobile device based at least in part on mitigating interference to a disparate communication technology. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving one or more parameters regarding resources utilized for communicating by one or more disparate communication technologies 904. As described, the parameters can be received from a mobile device (e.g., via signaling), devices of the disparate communication technology, a specification or configuration, and/or the like.

Further, logical grouping 902 can comprise an electrical component for generating a resource allocation for a mobile device based at least in part on one or more parameters 906. As described, the resource allocation can avoid resources of the disparate communication technology (or resources that potentially interfere the disparate communication technology at a spectral regrowth or harmonic order product), avoid measurement gaps during which devices of the disparate communication technology communicate, include narrow band allocations over frequencies utilized by the disparate communication technology, and/or the like. Additionally, system 900 can include a memory 908 that retains instructions for executing functions associated with electrical components 904 and 906. While shown as being external to memory 908, it is to be understood that one or more of electrical components 904 and 906 can exist within memory 908.

Figure 10:
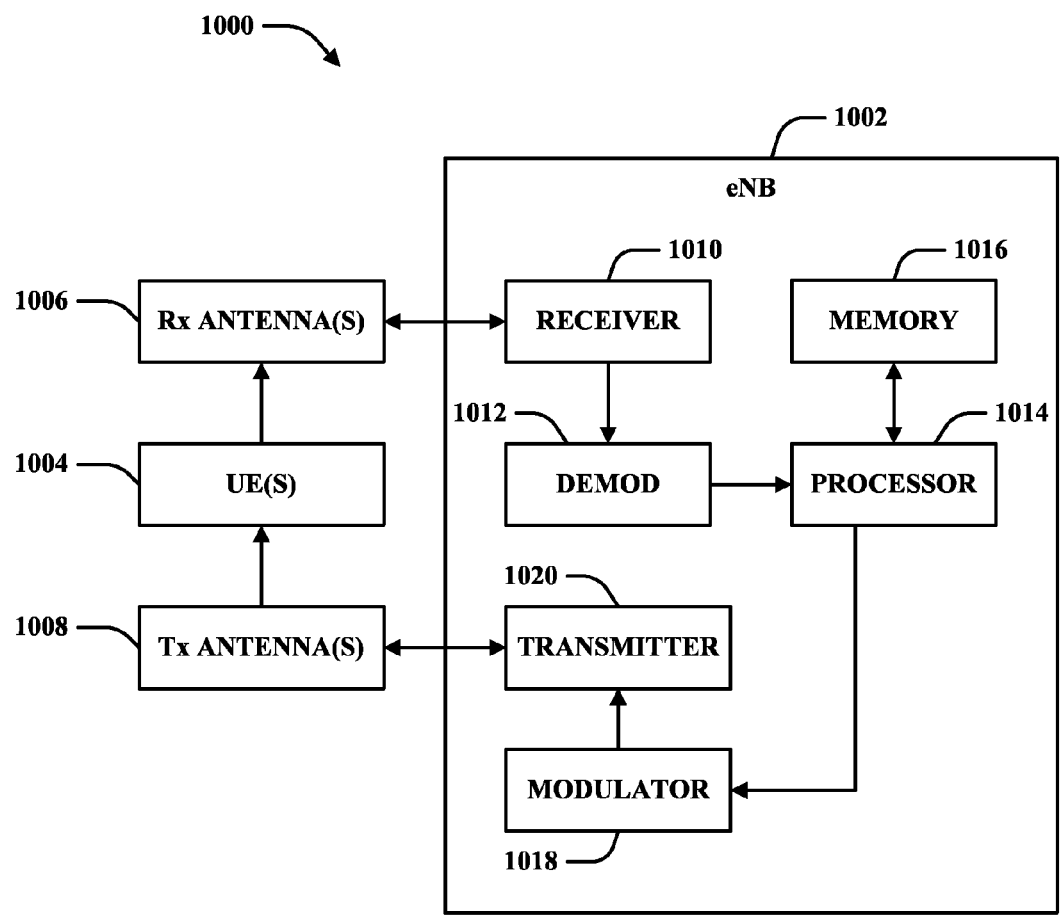
FIGS. 10-11 are block diagrams of example wireless communication devices that can be utilized to implement various aspects of the described functionality.

FIG. 10 is a block diagram of a system 1000 that can be utilized to implement various aspects of the functionality described herein. In one example, system 1000 includes a base station or eNB 1002. As illustrated, eNB 1002 can receive signal(s) from one or more UEs 1004 via one or more receive (Rx) antennas 1006 and transmit to the one or more UEs 1004 via one or more transmit (Tx) antennas 1008. Additionally, eNB 1002 can comprise a receiver 1010 that receives information from receive antenna(s) 1006. In one example, the receiver 1010 can be operatively associated with a demodulator (Demod) 1012 that demodulates received information. Demodulated information can then be analyzed by a processor 1014. Processor 1014 can be coupled to memory 1016, which can store information related to code clusters, access terminal assignments, lookup tables related thereto, unique scrambling sequences, and/or other suitable types of information. In one example, eNB 1002 can employ processor 1014 to perform methodologies 400, 500, 600, and/or other similar and appropriate methodologies. eNB 1002 can also include a modulator 1018 that can multiplex a signal for transmission by a transmitter 1020 through transmit antenna(s) 1008.

Figure 11:
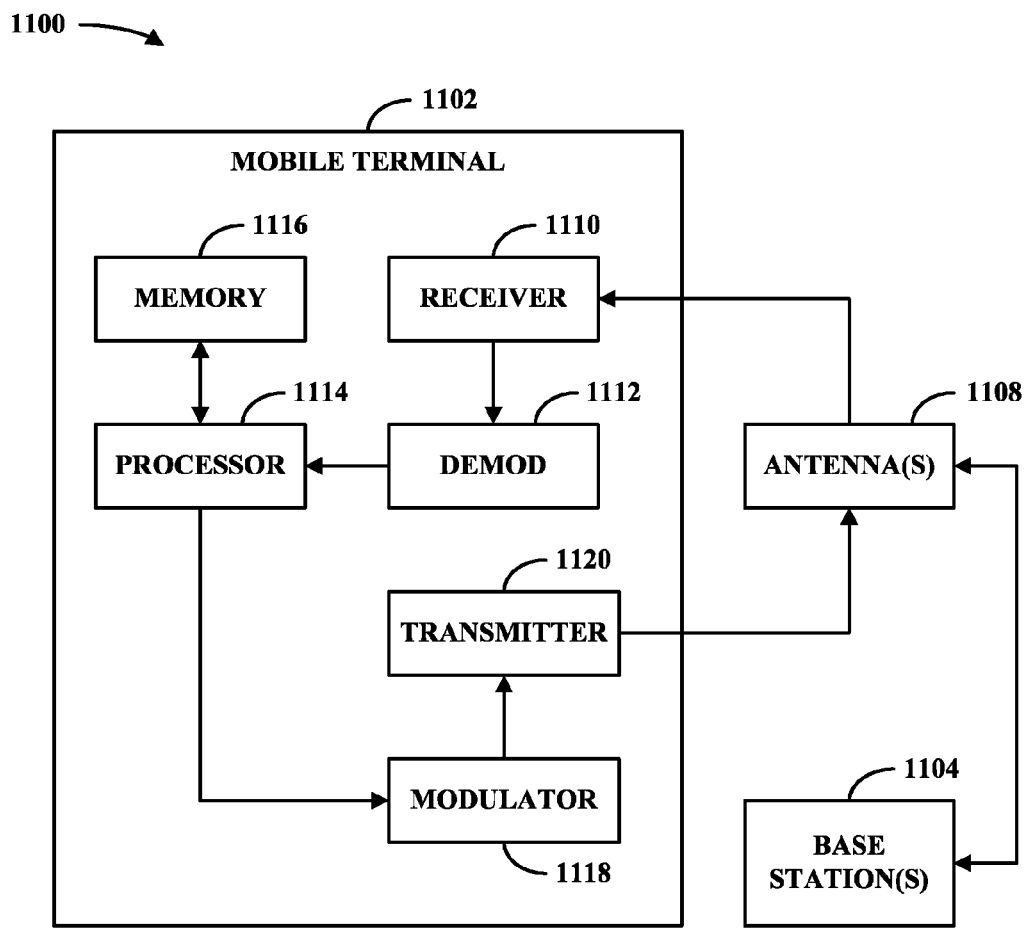

FIG. 11 is a block diagram of another system 1100 that can be utilized to implement various aspects of the functionality described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally, mobile terminal 1102 can comprise a receiver 1110 that receives information from antenna(s) 1108. In one example, receiver 1110 can be operatively associated with a demodulator (Demod) 1112 that demodulates received information. Demodulated information can then be analyzed by a processor 1114. Processor 1114 can be coupled to memory 1116, which can store data and/or program codes related to mobile terminal 1102. Additionally, mobile terminal 1102 can employ processor 1114 to perform methodologies 400, 500, 600, and/or other similar and appropriate methodologies. Mobile terminal 1102 can also employ one or more components described in previous figures to effectuate the described functionality. In one example, the components can be implemented by the processor 1114. Mobile terminal 1102 can also include a modulator 1118 that can multiplex a signal for transmission by a transmitter 1120 through antenna(s) 1108.

Figure 12:
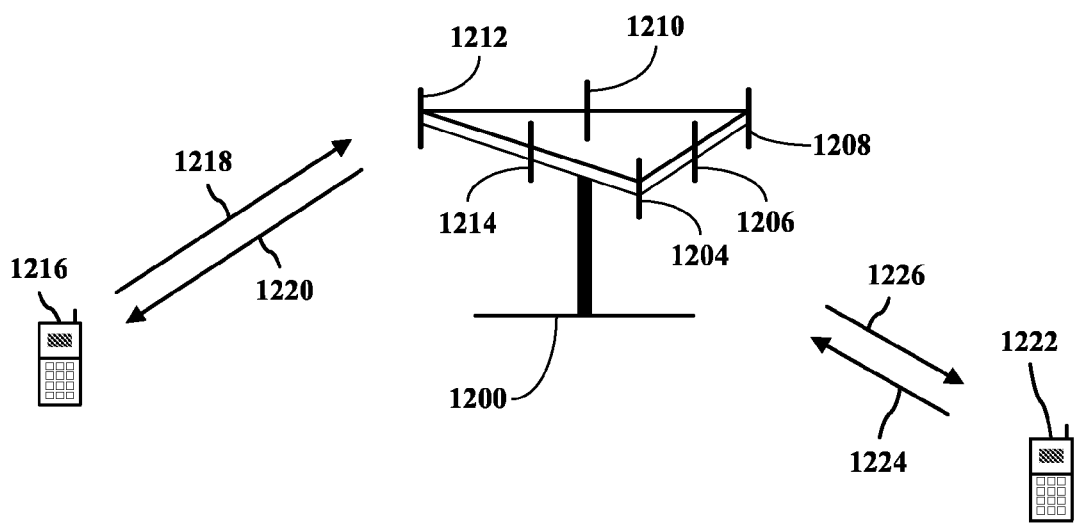
FIG. 12 illustrates an example wireless multiple-access communication system in accordance with various aspects set forth herein.

Referring now to FIG. 12, an illustration of a wireless multiple-access communication system is provided in accordance with various aspects. In one example, an access point 1200 (AP) includes multiple antenna groups. As illustrated in FIG. 12, one antenna group can include antennas 1204 and 1206, another can include antennas 1208 and 1210, and another can include antennas 1212 and 1214. While only two antennas are shown in FIG. 12 for each antenna group, it should be appreciated that more or fewer antennas may be utilized for each antenna group. In another example, an access terminal 1216 can be in communication with antennas 1212 and 1214, where antennas 1212 and 1214 transmit information to access terminal 1216 over forward link 1220 and receive information from access terminal 1216 over reverse link 1218. Additionally and/or alternatively, access terminal 1222 can be in communication with antennas 1206 and 1208, where antennas 1206 and 1208 transmit information to access terminal 1222 over forward link 1226 and receive information from access terminal 1222 over reverse link 1224. In a frequency division duplex system, communication links 1218, 1220, 1224 and 1226 can use different frequencies for communication. For example, forward link 1220 may use a different frequency than that used by reverse link 1218.

Each group of antennas and/or the area in which they are designed to communicate can be referred to as a sector of the access point. In accordance with one aspect, antenna groups can be designed to communicate to access terminals in a sector of areas covered by access point 1200. In communication over forward links 1220 and 1226, the transmitting antennas of access point 1200 can utilize beamforming in order to improve the signal-to-noise ratio of forward links for the different access terminals 1216 and 1222. Also, an access point using beamforming to transmit to access terminals scattered randomly through its coverage causes less interference to access terminals in neighboring cells than an access point transmitting through a single antenna to all its access terminals.

An access point, e.g., access point 1200, can be a fixed station used for communicating with terminals and can also be referred to as a base station, an eNB, an access network, and/or other suitable terminology. In addition, an access terminal, e.g., an access terminal 1216 or 1222, can also be referred to as a mobile terminal, user equipment, a wireless communication device, a terminal, a wireless terminal, and/or other appropriate terminology.

Figure 13:
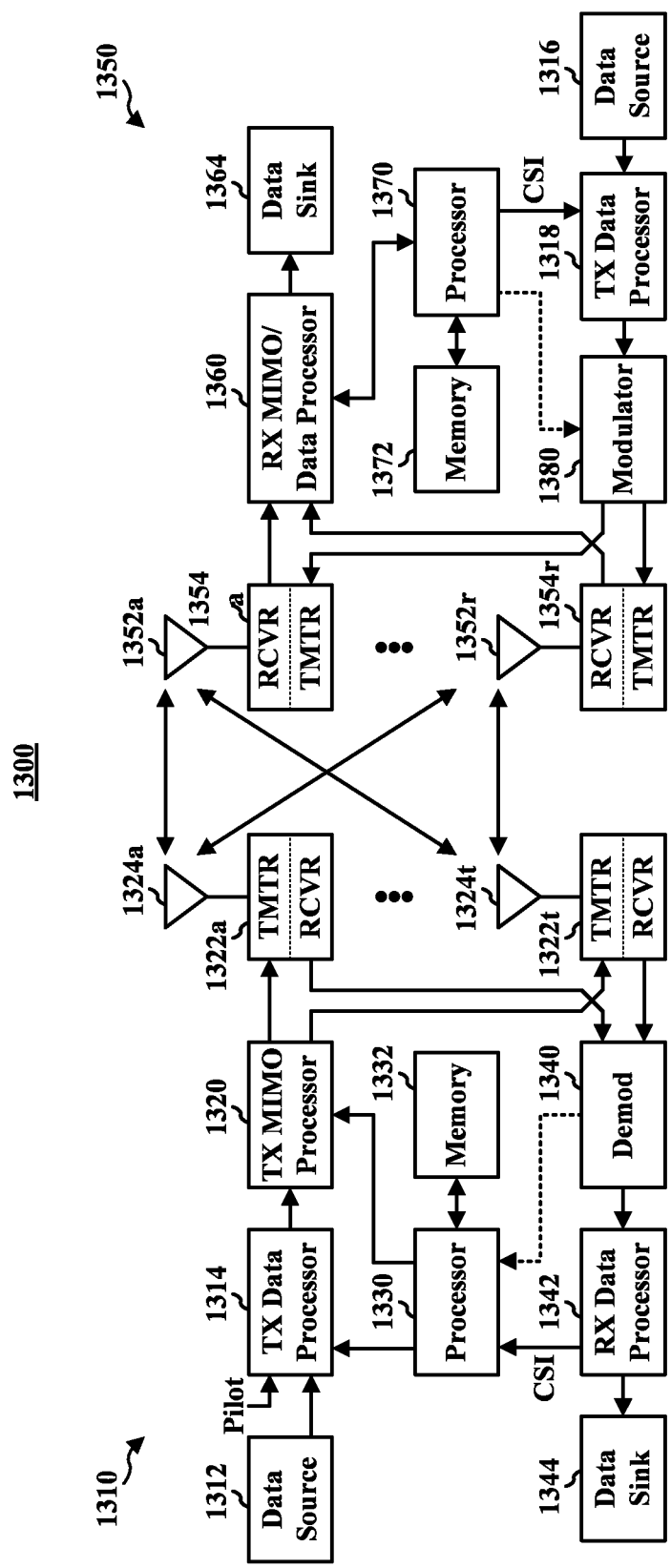
FIG. 13 is a block diagram illustrating an example wireless communication system in which various aspects described herein can function.

Referring now to FIG. 13, a block diagram illustrating an example wireless communication system 1300 in which various aspects described herein can function is provided. In one example, system 1300 is a multiple-input multiple-output (MIMO) system that includes a transmitter system 1310 and a receiver system 1350. It should be appreciated, however, that transmitter system 1310 and/or receiver system 1350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1310 and/or receiver system 1350 described herein could be utilized in connection with a single output to single input antenna system.

In accordance with one aspect, traffic data for a number of data streams are provided at transmitter system 1310 from a data source 1312 to a transmit (TX) data processor 1314. In one example, each data stream can then be transmitted via a respective transmit antenna 1324. Additionally, TX data processor 1314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1350 to estimate channel response. Back at transmitter system 1310, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1330.

Next, modulation symbols for all data streams can be provided to a TX processor 1320, which can further process the modulation symbols (e.g., for OFDM). TX MIMO processor 1320 can then provide $N_T$ modulation symbol streams to $N_T$ transceivers 1322a through 1322t. In one example, each transceiver 1322 can receive and process a respective symbol stream to provide one or more analog signals. Each transceiver 1322 can then further condition (e.g., amplify, filter, and upconvert) the analog signals to provide a modulated signal suitable for transmission over a MIMO channel. Accordingly, $N_T$ modulated signals from transceivers 1322a through 1322t can then be transmitted from $N_T$ antennas 1324a through 1324t, respectively.

In accordance with another aspect, the transmitted modulated signals can be received at receiver system 1350 by $N_R$ antennas 1352a through 1352r. The received signal from each antenna 1352 can then be provided to respective transceivers 1354. In one example, each transceiver 1354 can condition (e.g., filter, amplify, and downconvert) a respective received signal, digitize the conditioned signal to provide samples, and then processes the samples to provide a corresponding "received" symbol stream. An RX MIMO/data processor 1360 can then receive and process the $N_R$ received symbol streams from $N_R$ transceivers 1354 based on a particular receiver processing technique to provide $N_T$ "detected" symbol streams. In one example, each detected symbol stream can include symbols that are estimates of the modulation symbols transmitted for the corresponding data stream. The RX MIMO/Data processor 1360 can then process each symbol stream at least in part by demodulating, deinterleaving, and decoding each detected symbol stream to recover traffic data for a corresponding data stream. Thus, the processing by RX MIMO/Data processor 1360 can be complementary to that performed by TX MIMO processor 1320 and TX data processor 1314 at transmitter system 1310. RX MIMO/Data processor 1360 can additionally provide processed symbol streams to a data sink 1364.

In accordance with one aspect, the channel response estimate generated by RX MIMO/Data processor 1360 can be used to perform space/time processing at the receiver, adjust power levels, change modulation rates or schemes, and/or other appropriate actions. Additionally, RX MIMO/Data processor 1360 can further estimate channel characteristics such as, for example, signal-to-noise-and-interference ratios (SNRs) of the detected symbol streams. RX MIMO/Data processor 1360 can then provide estimated channel characteristics to a processor 1370. In one example, RX MIMO/Data processor 1360 and/or processor 1370 can further derive an estimate of the "operating" SNR for the system. Processor 1370 can then provide channel state information (CSI), which can comprise information regarding the communication link and/or the received data stream. This information can include, for example, the operating SNR. The CSI can then be processed by a TX data processor 1318, modulated by a modulator 1380, conditioned by transceivers 1354a through 1354r, and transmitted back to transmitter system 1310. In addition, a data source 1316 at receiver system 1350 may provide additional data to be processed by TX data processor 1318.

Back at transmitter system 1310, the modulated signals from receiver system 1350 can then be received by antennas 1324, conditioned by transceivers 1322, demodulated by a demodulator 1340, and processed by a RX data processor 1342 to recover the CSI reported by receiver system 1350. In one example, the reported CSI can then be provided to processor 1330 and used to determine data rates as well as coding and modulation schemes to be used for one or more data streams. The determined coding and modulation schemes can then be provided to transceivers 1322 for quantization and/or use in later transmissions to receiver system 1350. Additionally and/or alternatively, the reported CSI can be used by processor 1330 to generate various controls for TX data processor 1314 and TX MIMO processor 1320. In another example, CSI and/or other information processed by RX data processor 1342 can be provided to a data sink 1344.

In one example, processor 1330 at transmitter system 1310 and processor 1370 at receiver system 1350 direct operation at their respective systems. Additionally, memory 1332 at transmitter system 1310 and memory 1372 at receiver system 1350 can provide storage for program codes and data used by processors 1330 and 1370, respectively. Further, at receiver system 1350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for wireless communications by an apparatus of a first communication technology, comprising:
   receiving, by a mobile device, a resource allocation from an access point (AP);
   determining a time period during which a transmission utilizing the resource allocation potentially interferes with a communication by a device using a second communication technology; and
   lowering transmit power for a transmission scheduled to use the resource allocation during the time period.

2. The method of claim 1, further comprising:
   receiving a signal from the device, wherein the time period is determined from the received signal.

3. The method of claim 2, wherein the mobile device is configured with a co-located radio, and wherein the signal is received using the co-located radio.

4. The method of claim 2, wherein the received signal includes an indication of one or more resources used by the device, and wherein a transmission by the mobile device using a resource from the resource allocation that coincides with the one or more resources used by the device potentially interferes with the device.

5. The method of claim 2, wherein the received signal includes an indication of a measurement gap during which the device using the second communication technology transmits.

6. The method of claim 1, wherein lowering the transmit power comprises cancellation of the transmission scheduled to use the resource allocation during the time period.

7. The method of claim 1, wherein the transmission scheduled to use the resource allocation potentially interferes with the device using the second communication technology at a spectral regrowth or second harmonic order.

8. The method of claim 1, wherein the second communication technology comprises a global positioning system (GPS) communication technology, a MediaFLO communication technology, a digital video broadcasting-handheld (DVB-H) communication technology, or any combination thereof.

9. A wireless communications apparatus of a first communication technology, comprising:
   at least one processor configured to:
      receive, by a mobile device, a resource allocation from an access point (AP);
      determine a time period during which a transmission utilizing the resource allocation potentially interferes with a communication by a device using a second communication technology; and lower transmit power for a transmission scheduled to use the resource allocation during the time period; and a memory coupled to the at least one processor.

10. The wireless communications apparatus of claim 9, wherein the at least one processor is further configured to:
receive a signal from the device, wherein the time period is determined from the received signal.

11. The wireless communications apparatus of claim 10, wherein the mobile device is configured with a co-located radio, and wherein the at least one processor is configured to receive the signal using the co-located radio.

12. The wireless communications apparatus of claim 10, wherein the received signal includes an indication of one or more resources used by the device, and wherein a transmission by the mobile device using a resource from the resource allocation that coincides with the one or more resources used by the device potentially interferes with the device.

13. The wireless communications apparatus of claim 10, wherein the received signal includes an indication of a measurement gap during which the device using the second communication technology transmits.

14. The wireless communications apparatus of claim 9, wherein lowering the transmit power comprises cancellation of the transmission scheduled to use the resource allocation during the time period.

15. The wireless communications apparatus of claim 9, wherein the transmission scheduled to use the resource allocation potentially interferes with the device using the second communication technology at a spectral regrowth or second harmonic order.

16. The wireless communications apparatus of claim 9, wherein the second communication technology comprises a global positioning system (GPS) communication technology, a MediaFLO communication technology, a digital video broadcasting-handheld (DVB-H) communication technology, or any combination thereof.

17. A wireless communications apparatus of a first communication technology, comprising:
means for receiving, by a mobile device, a resource allocation from an access point (AP);
means for determining a time period during which a transmission utilizing the resource allocation potentially interferes with a communication by a device using a second communication technology; and
means for lowering transmit power for a transmission scheduled to use the resource allocation during the time period.

18. The wireless communications apparatus of claim 17, further comprising:
means for receiving a signal from the device, wherein the time period is determined from the received signal.

19. The wireless communications apparatus of claim 18, wherein the received signal includes an indication of one or more resources used by the device, and wherein a transmission by the mobile device using a resource from the resource allocation that coincides with the one or more resources used by the device potentially interferes with the device.

20. The wireless communications apparatus of claim 18, wherein the received signal includes an indication of a measurement gap during which the device using the second communication technology transmits.

21. A non-transitory computer-readable medium storing computer executable code for wireless communication which, when executed by a processor, cause the processor to perform:
receiving, by a mobile device, a resource allocation from an access point (AP);
determining a time period during which a transmission utilizing the resource allocation potentially interferes with a communication by a device using a second communication technology; and
lowering transmit power for a transmission scheduled to use the resource allocation during the time period.

22. The non-transitory computer-readable medium storing computer executable code of claim 21, further comprising code to cause the processor to perform:
receiving a signal from the device, wherein the time period is determined from the received signal.

23. The non-transitory computer-readable medium storing computer executable code of claim 22, wherein the received signal includes an indication of one or more resources used by the device, and wherein a transmission by the mobile device using a resource from the resource allocation that coincides with the one or more resources used by the device potentially interferes with the device.

24. The non-transitory computer-readable medium storing computer executable code of claim 22, wherein the received signal includes an indication of a measurement gap during which the device using the second communication technology transmits.

* * * * *